United States Patent [19]

Morcos et al.

[11] 4,300,443
[45] Nov. 17, 1981

[54] BROILING APPARATUS

[75] Inventors: Joseph A. Morcos, Integrated Systems Engineering, 1518 Walnut St., Ste. 200, Philadelphia, Pa. 19102; George A. Morcos, Philadelphia, Pa.

[73] Assignee: Joseph A. Morcos, Philadelphia, Pa.

[21] Appl. No.: 154,315

[22] Filed: May 29, 1980

[51] Int. Cl.³ .............................................. A47J 37/04
[52] U.S. Cl. ....................................... 99/332; 99/353; 99/421 V; 99/449; 99/537; 426/518; 426/523
[58] Field of Search .................. 99/353, 421 V, 443 R, 99/449, 332, 327, 421 R, 421 H, 421 HH, 421 HV, 538, 339; 83/870; 426/523, 518

[56] References Cited

U.S. PATENT DOCUMENTS

| | | | |
|---|---|---|---|
| 1,871,654 | 8/1932 | Blier | 99/421 V |
| 2,049,481 | 8/1936 | Walterspiel | 99/421 V |
| 2,566,524 | 9/1951 | Kammins | 99/427 |
| 2,581,570 | 1/1952 | Amanatides | 99/421 V |
| 2,687,080 | 8/1954 | Dorin | 99/339 |
| 2,795,183 | 6/1957 | Parr | 99/421 H |
| 2,956,497 | 10/1960 | Bernstein | 99/421 H |
| 3,140,649 | 7/1964 | Bacque | 99/353 X |
| 3,153,436 | 10/1965 | Chesley | 99/538 |
| 3,277,846 | 10/1966 | Kesselman | 83/870 X |
| 3,582,356 | 1/1971 | Thomas | 99/421 H |
| 3,604,341 | 9/1971 | Coroneos | 99/421 V |
| 3,951,054 | 4/1976 | Frentzel | 99/538 |
| 4,170,174 | 10/1979 | Ditty | 99/538 |

Primary Examiner—Billy J. Wilhite
Attorney, Agent, or Firm—Howson and Howson

[57] ABSTRACT

A drum of meat, consisting of an assembly of layers of meat chunks is rotated on a vertical spit, cooked by radiant heat supplied by a plurality of heating elements, and sliced by an automatically advancing paring apparatus. Certain of the heating elements are moved automatically toward the spit axis, and certain groups of heating elements are automatically deenergized as the diameter of the meat drum decreases.

9 Claims, 16 Drawing Figures

BROILING APPARATUS

BRIEF SUMMARY OF THE INVENTION

This invention relates to the art of cooking, and particularly to a broiling apparatus intended for use in restaurants for preparing meat.

U.S. Pat. No. 3,604,341, dated Sept. 14, 1971 to James H. Coroneos, describes a prior broiler having a general resemblance to the broiler of the present invention in that it takes the form of a vertical rotisserie in which meat is supported on a spit rotatable about a vertical axis, and is cooked by radiant heat provided by electrical heater elements arranged in an arcuate configuration adjacent the meat. In Coroneos' broiler, the meat is rotated either by a hand wheel, or alternatively by an electric motor. In the commercial version of the Coroneos broiler, meat is placed in the broiler in the form of a cylinder on a vertical skewer, and is removed from the cylinder by a hand knife.

Various other forms of cooking devices similar to the device shown in the Coroneos patent are known. For example, Dorin U.S. Pat. No. 2,687,080 describes a vertical spit for roasting foods such as a fowl, fish, meat and the like, in which the food is cooked by means of suitable sources of heat such as gas racks, wood fires or electrical heater elements, while being rotated about vertical axes on spits which hold the food adjacent the heating elements.

Thomas U.S. Pat. No. 3,582,356 describes a similar cooking device in which meat patties are cooked over a grill while rotating on a horizontal spit. The grill can be a gas burner, a charcoal fire, or an array of electrical heating elements.

Prior cooking devices, including those of the above-mentioned patents are capable of cooking meat satisfactorily. However, with these devices it is difficult to produce uniform cooking. It is not possible with these prior cooking devices to produce cooked meat with the speed and efficiency needed in a modern restaurant.

Conventional electrically heated rotisseries such as those described in the Coroneos and Dorin patents cannot satisfactorily handle meat supplied in relatively small chunks. Their utility is limited to the cooking of large homogenous cylinders made from ground meat, or relatively large items such as chickens, large pieces of beef, and the like. The rotisserie in the Thomas patent is capable of cooking relatively small chunks of meat. However, with the Thomas device, it is necessary to cook a full spit of meat thoroughly, and then to remove the spit all at once and serve the meat. It is not practical, with the Thomas device, to remove small quantities of meat, as needed for service to restaurant customers.

The principal object of this invention is to provide an apparatus capable of broiling meat with high speed and efficiency, which apparatus is specially adapted for use in modern restaurants.

It is also an object of this invention to provide a broiling device capable of producing a cooked product having a high degree of uniformity.

A still further object of the invention is to provide a broiler having a high degree of versatility in its meat handling capabilities and specifically a broiler which is capable of handling not only large pieces of meat, but also assemblies of smaller pieces mechanically held together.

The broiling apparatus in accordance with the invention comprises a rotatable spit for holding a drum of meat and rotating the meat about an axis of rotation, which is preferably vertical. The term "drum" as used herein should be understood as including specially prepared cylinders of meat having a substantially homogenous texture, such as the cylinder shown in the Coroneos patent, as well as assemblies of smaller chunks of meat held together by mechanical means. The term "drum" includes not only cylinders, but cones and other shapes as well. In general, these drums are in a form such that their outer surfaces are surfaces of revolution.

The broiling apparatus in accordance with the invention includes means for rotating the spit, and heating means, preferably electrically energized resistive heating elements, for applying radiant heat to the meat held on the spit.

The broiling apparatus is characterized by paring means for removing an outer layer from the drum of meat as the drum rotates. The paring means comprises blade means, preferably in the form of a pair of side-by-side reciprocating blades, presenting a cutting edge extending substantially parallel to the axis of rotation of the spit. The paring means includes means for advancing the blade means toward the spit axis as the spit rotates. As a consequence of the advancing movement of the blade means, an outer layer of meat is removed by the blade means from the drum after it is cooked. This outer layer falls away from the drum, and is collected and served to the customer. Where the drum is in the form of an assembly of smaller chunks of meat, the result of the cutting action of the blade is the production of a number of relatively small slices of meat rather than one large slice.

Preferably, the blade means is advanced in a substantially straight path toward the spit axis. Cutting is effected by the rotation of the drum. Consequently, a relatively simple blade mounting structure can be used.

In accordance with the invention, as the drum of meat becomes smaller as a result of cutting by the paring means, automatic modifications are made in the heating system. The heating system comprises a plurality of separate, electrically energized, resistive heating elements. At least one of these heating elements is movable toward the spit axis as the drum of meat rotates. The other heating element is automatically disabled by shutting off its electrical current when the movable heating element reaches an intermediate location in its path of travel.

Preferably, at least two of the heating elements are movable, and are arranged to move toward the spit axis in converging paths. To prevent these elements from interfering with each other, one of the heating elements is automatically stopped at an intermediate location in its path of travel while the other heating element is permitted to continue its advancing movement.

For assembling a drum from a plurality of small individual chunks of meat, the spit in accordance with the invention is specially constructed from an elongated rod which is normally located at and aligned with the spit axis. This rod has a substantially uniform non-circular cross-section along at least a portion of its length. A series of circular plates having non-circular openings are axially slidable on the non-circular portion of the rod. These plates are prevented from lateral translation and from rotation relative to the rod by the engagement of the non-circular openings with the non-circular portion of the rod. The plates have axially extending teeth at their peripheries. Clamps are provided at the opposite ends of the series of plates for clamping the opposite ends of a series of layers of meat. The plates are positionable between adjacent layers of meat, and, by virtue of the fact that their teeth bite into the chunks of meat, these plates prevent rotation of the layers of meat relative to the rod.

Further objects of the invention will be apparent from the following detailed description when read in conjunction with the accompanying drawings.

DETAILED DESCRIPTION

Figure 1:
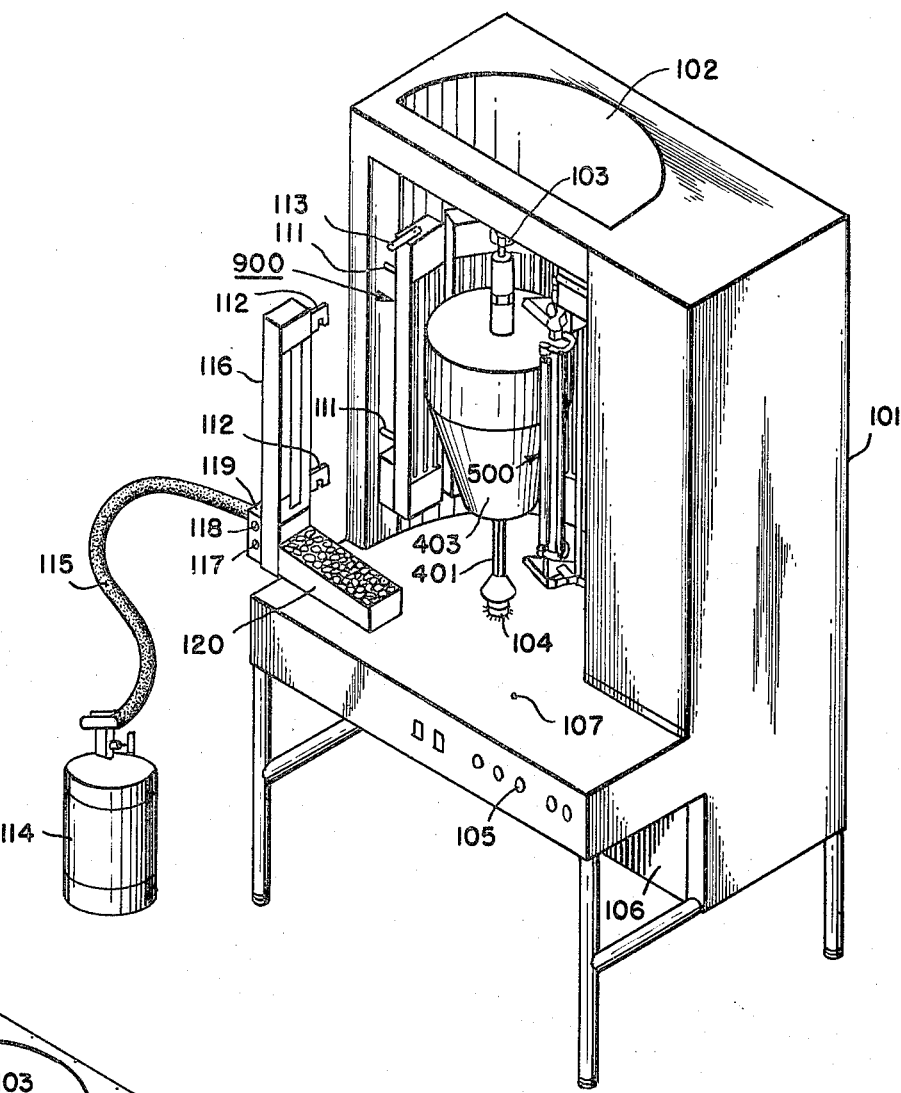
FIG. 1 is an oblique perspective view of the broiling apparatus in accordance with the invention, showing a drum of meat on a spit adjacent the heating elements of the apparatus, and also showing the paring means.

FIG. 1 shows the cabinet 101 of the broiling apparatus, which is preferably made from sheet stainless steel. The upper part of the cabinet has a cavity which is open in front and at the top, and which is defined in part by a cylindrical wall 102 having a semi-circular horizontal cross-sectional shape. A spit 401 is supported for rotation on a vertical axis in bearings 103 and 104. The location of these bearings is preferably such that the spit axis coincides with the axis of cylindrical wall 102.

A drum of meat, indicated at 403, is mounted on spit 401, and a paring apparatus, generally indicated at 500 is arranged with the cutting edge of its blade means parallel to the spit axis so that it is able to slice and remove an outer layer of meat from drum 403 as the drum rotates.

A semi-circular heater array 900, consisting of seven separate heating elements, is provided within the cavity on wall 102. While seven heating elements are shown, it should be understood that more or fewer than seven heating elements can be used.

Electrical controls are provided at 105, and a compartment 106, at the bottom of the cabinet, contains electrical components which will be described with reference to FIG. 10. The cabinet is also provided with a horizontal working surface 107.

A gas burner, indicated at 116 is provided with brackets 112 which allow for hanging of the burner assembly on pins 111 of an end heating element of heater array 900. A locking bar 113 is pivoted at the upper end of the heating element to lock the gas burner in place. A flexible line 115 delivers gas from supply tank 114 to the burner through a main gas valve 117 and a pilot gas valve 118, both of which are in safety component enclosure 119. A charcoal pan is provided at 120. The gas burner and the charcoal pan may be used respectively to produce the desired final surface condition of the cooked meat, and to impart a barbecue taste to the meat.

Figure 2:
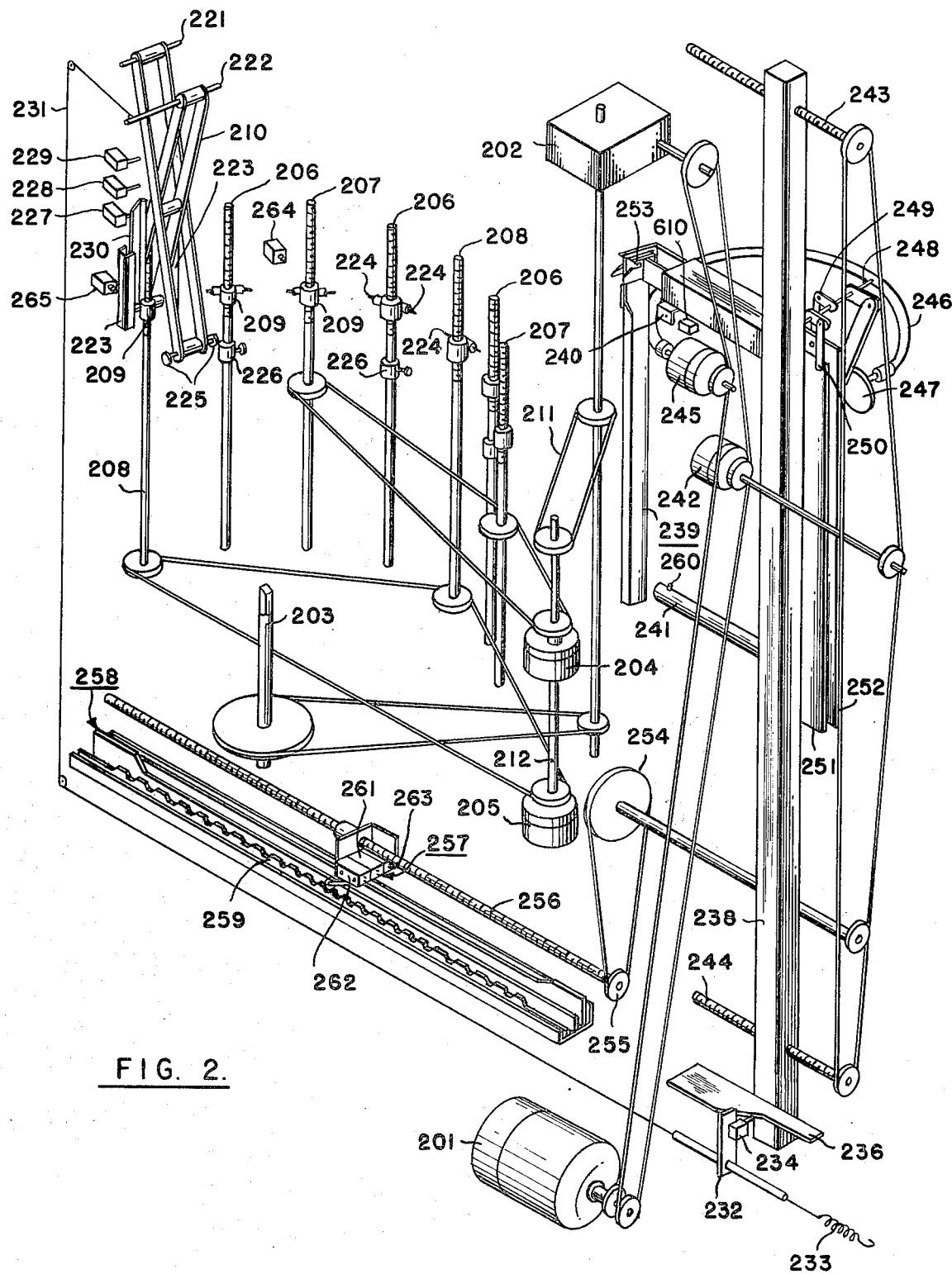
FIG. 2 is a perspective view of the driving mechanism of the apparatus, showing how the spit, the movable heating elements and the paring means are driven, and also showing a number of control cams and cam-driven electrical switches.

As shown in FIG. 2, the entire mechanism of the machine is driven by a motor 201, which drives the input shaft of a speed reducing right-angle gear box 202 through a flexible chain. The output shaft of gear box 202 is connected, through a chain, to drive shaft 203, which is the drive shaft for the spit. The upper end of shaft 203 extends through bearing 104 (FIGS. 1 and 4C) and has a square end adapted for driving engagement with the spit.

The output shaft of reducing gear box 202 is also connected through a chain 211 to drive a shaft 212. Two solenoid-controlled clutches 204 and 205 are arranged on shaft 212. The output sprocket of clutch 204 is connected through a chain to drive rotatable heating element positioning shafts 207. The sprocket of clutch 205 is similarly connected through another chain to drive movable heating element positioning shafts 208. Three shafts 206 are used to support normally fixed heating elements. Shafts 206, however, are manually adjustable in order to allow the normally fixed heaters to be set initially to their optimum positions.

Each of the heating element positioning shafts 206, 207 and 208, is threaded, and each has a nut 209 engaged with its threads, and movable vertically when the shaft rotates for the purpose of positioning the heaters through a scissors linkage 210, only one of which is shown for clarity.

The scissors linkage consist of two rigid elements which are pivoted together in an X-shaped configuration. At the upper end of one of the elements, pins 221 are provided. These pins are maintained in a fixed position by suitable bearings (not shown) in the housing of the apparatus. Pins 222 at the upper end of the other element of the scissors linkage are engaged with a bracket 905 (FIG. 9) on the back of a heating element. These pins support the heating element.

The opposite end of the linkage element having pins 222 is provided with rollers which ride vertically in guides 223. The rollers which ride in guides 223 are rotatable on bearings which are secured to nuts 209 which ride on the threads of the positioning shafts. Two such bearings are indicated at 224 on the central one of shafts 206, it being understood that the remaining positioning nuts are provided with similar bearings. The end of the linkage element having pins 221 is provided with rollers 225 which are engaged with guides 902 (FIG. 9) which are fixed to the back of the heating elements. As pins 222 move horizontally, rollers 225 remain directly underneath pins 222. The heating element is advanced or retracted depending on the direction of rotation of the drive shaft. The heating elements are maintained by the linkage in a vertical position and at the same elevation at all times.

Shafts 206, for the normally stationary heating elements, extend through collars 226. These collars are fixed to the machine frame and have screws for locking the shafts in the collars. To position a normally stationary heating element, its locking screw is loosened, its shaft is rotated, and the screw is then retightened to secure the shaft.

Three microswitches 227, 228, and 229 are arranged to be actuated successively by cam 230 which is fixed to nut 209 on the leftmost heating element positioning shaft 208. Switches 227 and 228 are normally closed double pole-single throw switches. Switch 229 is a normally closed single pole-single throw switch. These switches are successively opened in a manner such that switch 227 remains open when cam 230 actuates switches 228 and 229, and switch 228 similarly remains open when the cam actuates switch 229. Switch 227 is used as a limit switch to interrupt electric power to the fixed heating elements. Switch 228 is used to stop the advance of the heaters on positioning shafts 207 by interrupting the delivery of current to clutch 204. Switch 229 is used to stop the advance of the heating elements on shafts 208 by interrupting the delivery of current to clutch 205. Switch 229 is also connected to interrupt the path of electric current to all of the heating elements and serves to prevent overtravel of the heating elements.

The advance of the movable heating elements is controlled by a follow-up mechanism arranged so that the heating elements follow the movement of the paring knife. A flexible cord 231 is secured to an extension of pins 222 on scissors linkage 210, and runs over pulleys to a movable bracket 232. Cord 231 is held in tension by spring 233, which pulls bracket 232 to the right. Bracket 232 mounts a position-sensing microswitch 234 which is normally in engagement with cam 236 and held thereby in an electrically open condition. Cam 236 is carried on a carriage 238 which is driven by screws 243 and 244. A cutter generally indicated at 239 is supported on carriage 238 by brackets 240 and 241. Carriage drive screws 243 and 244 are driven through a chain drive by clutch 242, the input of which is driven through the main drive chain by motor 201. The main drive chain also drives the input shaft of a clutch 245, the output shaft of which is connected through a flexible shaft 246 to an eccentric 247 arranged to oscillate shaft 248 through a crank.

A pair of cranks 249 and 250 respectively actuate arms 252 and 251 so that they reciprocate vertically in opposite directions. These arms are connected respectively to the side-by-side blades of cutter 239 by means of pins 253.

The chain which controls the movement of the carriage 238, and which is connected to the main drive chain through clutch 242, also drives screw 256 through sprockets 254 and 255. An assembly 257 of microswitches rides on screw 256 along a bank 258 of cams. These cams control the overall operation of the machine.

Switch 264 is actuated by the heating element on the third positioning shaft when the heating element is fully retracted. Switch 265 is similarly actuated by the leftmost heating element when it is fully retracted. These switches establish limits on the retracting movements of the various movable heating elements.

Pin 260, which extends upwardly from lower cutter support bracket 241, is used to prevent lateral movement of the cutter assembly.

Figure 3:
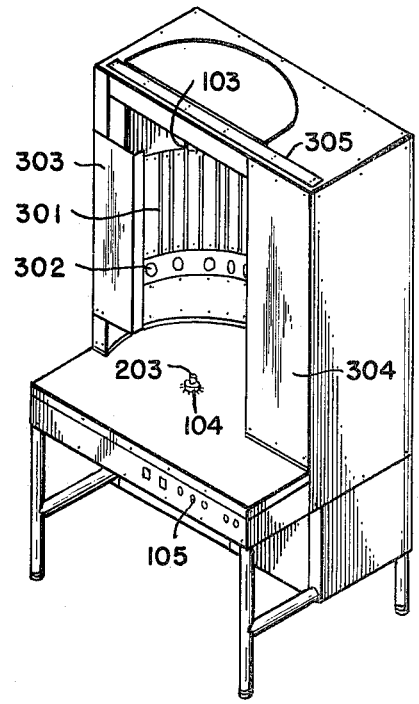
FIG. 3 is a perspective view of the housing of the broiling apparatus with the heating elements removed.

As shown in FIG. 3, the wall of the cavity is provided with vertically extending slots 301. The elements of the scissors linkages extend through these slots. Cables deliver electrical power to the heating elements through openings 302.

Safety shield 303 prevents access to the leftmost scissors linkage. This shield is used when the broiling apparatus is operated without the gas burner.

Removable panel 304 serves as a protective shield for the rightmost scissors linkage, and also as a cover for the mechanism of the paring apparatus. A removable cover 305 is provided for access to the upper carriage driving screw 243 (FIG. 2).

Figure 4A:
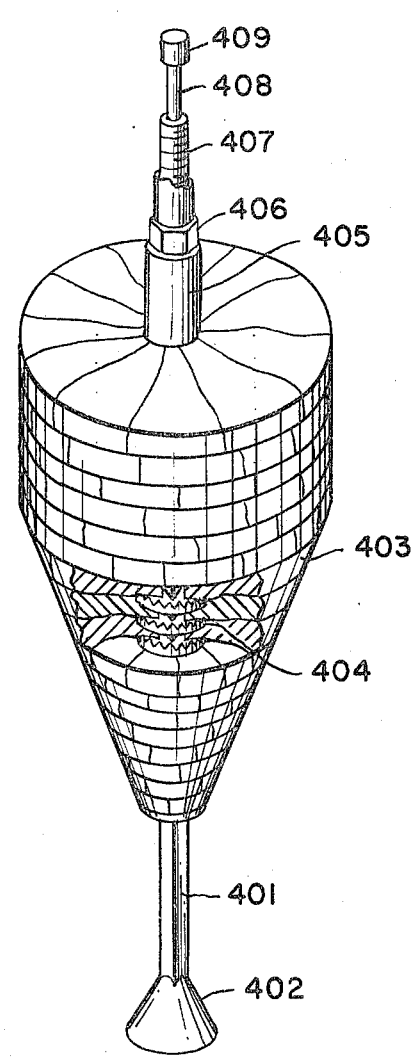
FIG. 4A is a perspective view, partly broken away, of a drum formed by assembling chunks of meat on a spit.

FIG. 4A shows spit 401 which, through the major portion of its length, is cylindrical, but of a non-circular (for example square) cross-section. At the bottom of the spit, a conical shield 402 is provided for the purpose of protecting the lower spit bearing 104 (FIGS. 1 and 4C) from damage either by heat or by dripping juice from the meat.

Meat chunks are assembled into a drum 403, which is preferably shaped so that its upper part is in the form of a circular cylinder, while its lower part is conical, and tapered toward the lower end. The reason for this shape is twofold. First, the lower layers of meat are better supported when the lower portion of the drum is conical. Second, the tapered lower portion of the drum causes the amount of meat cut in each rotation of the drum to remain nearly constant even though the diameter of the drum decreases a cutting takes place. To insure the delivery of uniform quantities of meat in each cutting operation, further compensation is provided by a notched control cam 259 in cam bank 258. The function of the notched control cam is set forth below in the description of the control operation with reference to FIG. 2.

Figure 4B:
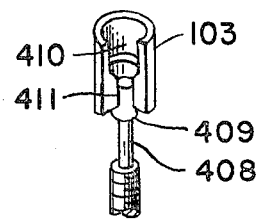
FIG. 4B is a perspective view showing a bearing for rotatably and removably supporting the upper end of the spit.
Figure 4C:
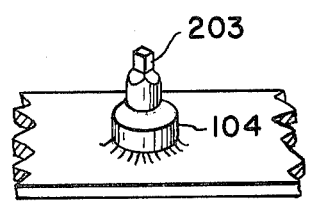
FIG. 4C is a perspective view showing the drive shaft for the spit, protruding upwardly through a bearing on the working table of the apparatus.
Figure 4D:
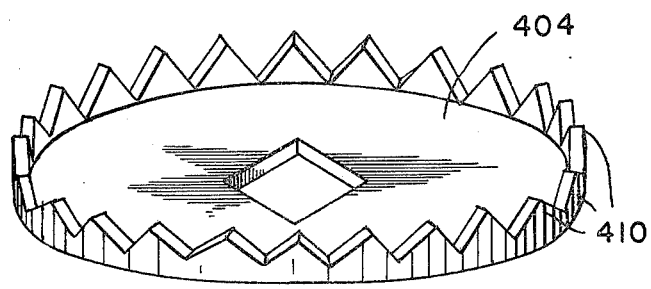
FIG. 4D is a perspective view of a toothed plate used to secure the assembly of meat chunks on the spit.

The meat chunks are assembled with the aid of a series of toothed plates which are slidable on spit 401, but which are provided with non-circular openings which preferably conform to the cross-sectional shape of the spit to prevent rotation of the plates. As shown in FIG. 4D, plate 404 has axially extending teeth 410. The purpose of these axially extending teeth is to bite into the individual chunks of meat to hold them in place, and to cause them to be moved with the spit.

The chunks of meat are assembled in layers, with one toothed plate for each layer. A ring 405 is pressed against the uppermost layer by a nut 406 threaded onto threads 407 formed at the upper end of the spit. Nut 406 and ring 405 serve to compact the assembled meat chunks to form the drum.

At the upper end of the spit, just above threads 407, a narrow neck 408 is formed, with an enlarged cylindrical tip 409. As shown in FIG. 4B, neck 408 and enlarged tip 409 cooperate with bearing 103 to allow for insertion and removal of the spit from the broiler assembly. Bearing 103 has an enlarged side opening 410 at its upper end, and a smaller side opening 411 at its lower end. Opening 410 is sufficiently large to receive tip 409. Opening 411, however, while sufficiently large to receive neck 408, is insufficiently large to permit tip 409 to move laterally out of the bearing.

In installation of the spit and drum assembly, the lower end of the spit, which has a square socket, is placed over the square end of drive shaft 203 (FIG. 4C), and tip 409 at the upper end of the spit is moved into bearing 103 through opening 410. The entire spit is then lowered so that the lower end of the spit engages the upper end of drive shaft 203, and tip 409 falls into the lower portion of bearing 103, where it is held rotatably. The spit, when installed, is rotated about a vertical axis by shaft 203.

Figure 5C:
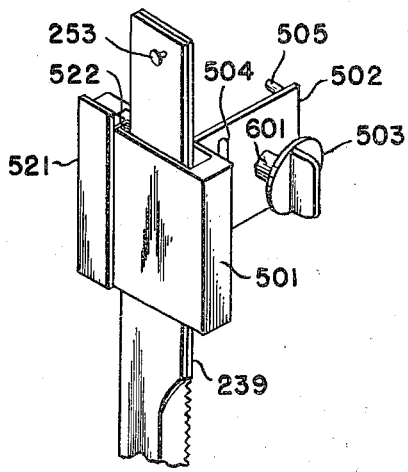
FIG. 5C is a fragmentary perspective view of the upper end of the cutter assembly showing a latch which prevents the cutter blades from falling out if the cutter assembly is inverted during handling.
Figure 5B:
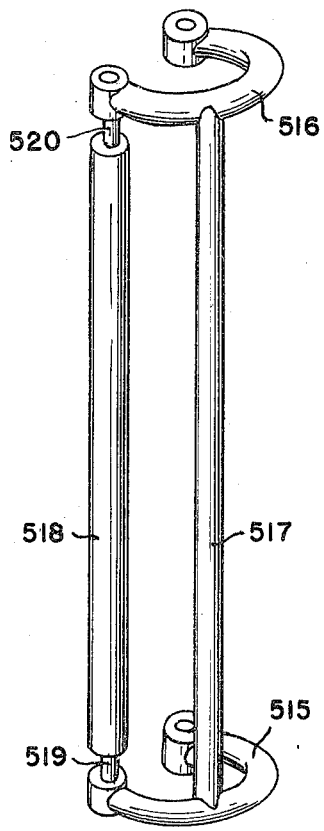
FIG. 5B is a perspective view of the protective guard.
Figure 5A:
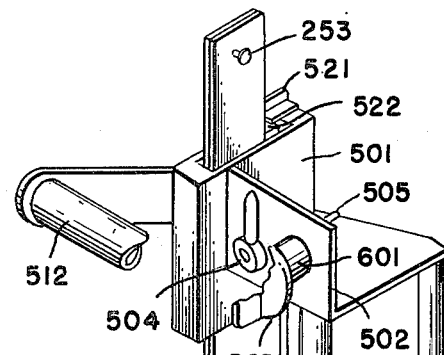
FIG. 5A is a perspective of the cutter assembly, with a protective guard removed for clarity.

The details of cutter assembly 500 are shown in FIGS. 5A, 5B and 5C.

The cutter 239 of the paring apparatus comprises a pair of blades arranged in side-by-side relationship to each other to present a single cutting edge formed by the adjacent edges of the two blades. The cutter operates by vertical reciprocation of the two blades in opposite directions. That is, as one blade moves upwardly, the other blade moves downwardly. Preferably, both blades have serrated edges, as shown in FIG. 5A for a more effective cutting action on meat. The blades are guided in upper and lower guides 501 and 506 respectively.

A plate 502, secured to upper guide 501, is provided for the purpose of removably locking the cutter assembly to the upper cutter support bracket 240 (FIG. 2). A locking knob 503, and a release knob 504 are provided on plate 502. The manner in which these knobs operate will be detailed below with reference to FIGS. 6A and 6B. A locating pin 505, on plate 502, cooperates with a hole in upper support bracket 240 to prevent lateral movement of the upper part of the cutter assembly.

Lower blade guide 506 is provided with a bracket 507 having two perpendicular oblique surfaces arranged in the form of the peak of a roof and adapted to rest on bracket 241 (FIG. 2), with locating pin 260 extending through notch 508. The upper and lower guide members are rigidly secured together by connecting rods 509, 510, and 511. (Connecting rod 510 is not shown in full in FIG. 5A for clarity.)

The upper and lower cutter guides are also provided respectively with handles 512 and 513 by which the entire cutter assembly can be removed from its supporting brackets for cleaning or for the replacement of parts.

Figure 7:
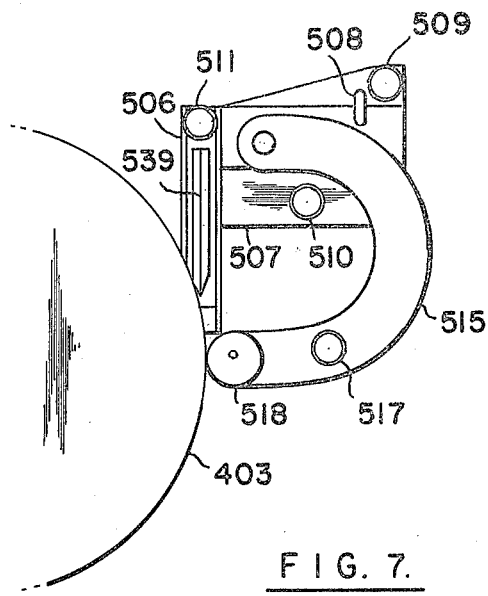
FIG. 7 is a horizontal section, as viewed from above, showing the cutter assembly in operation.
Figure 8:
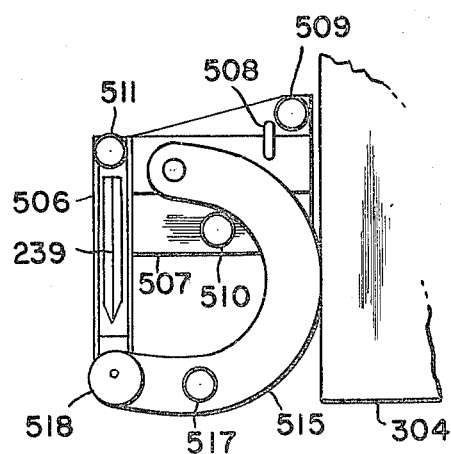
FIG. 8 is a horizontal section, as viewed from above, showing the cutter assembly with the protective guard in position to protect the cutting edge of the blade means and to protect the operator's hands during mounting of the meat drum.

A bearing 514, secured to lower cutter element guide 506, together with a similar bearing (not shown) secured to upper guide 501, provides a pivot for guard roller brackets 515 and 516, as shown in FIG. 5B. Brackets 515 and 516 are secured together by connecting rod 517, and a roller 518 is freely rotatable about a vertical axis on pins 519 and 520. When the guard roller assembly of FIG. 5B is in place in the cutter assembly of FIG. 5A, roller 518 is normally held by a spring (not shown) in a position directly in front of the cutting edge of cutter 239 as shown in FIG. 8. When the cutter is in operation, as shown in FIG. 7, the roller is moved away from the cutting edge by contact with meat drum 403, and allows the cutting edge to operate. Referring to FIG. 5C, upper guide 501 is provided with a spring element 521 having a tongue, which extends horizontally over steps 522 formed on the blades to prevent the blades from sliding out of the cutter assembly if it is inverted during handling. Element 521 is secured at its lower end to guide 501 and can be manually deflected to allow removal of the cutter blades. Lower guide 506 has an internal surface on which the lower ends of the cutter blades rest when the cutter assembly is removed from the machine and held upright.

Figure 6A:
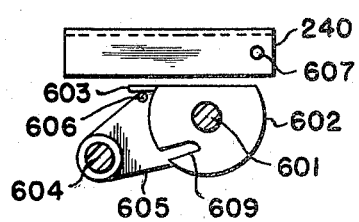
FIG. 6A is an elevation of a locking device for the cutter assembly, shown in the position in which the locking element clears the cutter assembly support bracket of the machine.
Figure 6B:
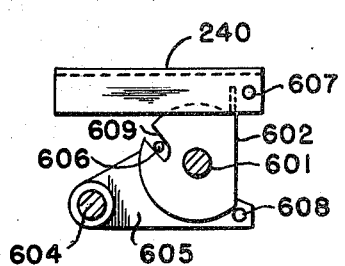
FIG. 6B is an elevational view showing the same locking device in the locked position.

FIGS. 6A and 6B illustrate the manner in which locking bracket 502 at the upper end of the cutter assembly (FIG. 5A) is locked in place on bracket 240 (FIG. 2). Knob 503 (FIGS. 5A and 5C) is connected through a shaft 601 to a segmental locking disc 602. In the position shown in FIG. 6A, locking disc 602 clears the depending portion of bracket 240. However, as shown in FIG. 6B, disc 602 can be rotated by the knob so that a portion of the disc is moved behind the depending portion of bracket 240. The overlap of the disc and the bracket cause the upper end of the cutter assembly to be locked in place. Pin 505 (FIG. 5A) extends through hole 607 in the bracket (FIGS. 6A and 6B) to secure the upper end of the cutter assembly against lateral movement with respect to the bracket. Handle 504 (FIGS. 5A and 5C) is connected through a shaft 604 to an arm 605. Arm 605 has a forwardly extending pin 606 which is adapted to engage a notch 609 formed in disc 602, in the manner shown in FIG. 6B. In order to release the cutter assembly, therefore, arm 605 first has to be moved by handle 504 so that pin 606 clears notch 609. Then, knob 503 has to be rotated so that disc 602 clears the depending portion of bracket 240. Projection 603 (FIG. 6A) of disc 602 abuts against pin 606 of arm 605 to prevent overtravel of the disc.

As shown in FIG. 6B, arm 605 is provided at its end remote from shaft 604 with a small magnet 608. This magnet activates a magnetically-operated switch 610 (FIG. 2) which controls the operation of the cutter, and allows cutter operation only when the locking assembly is in the condition shown in FIG. 6B.

Figure 9:
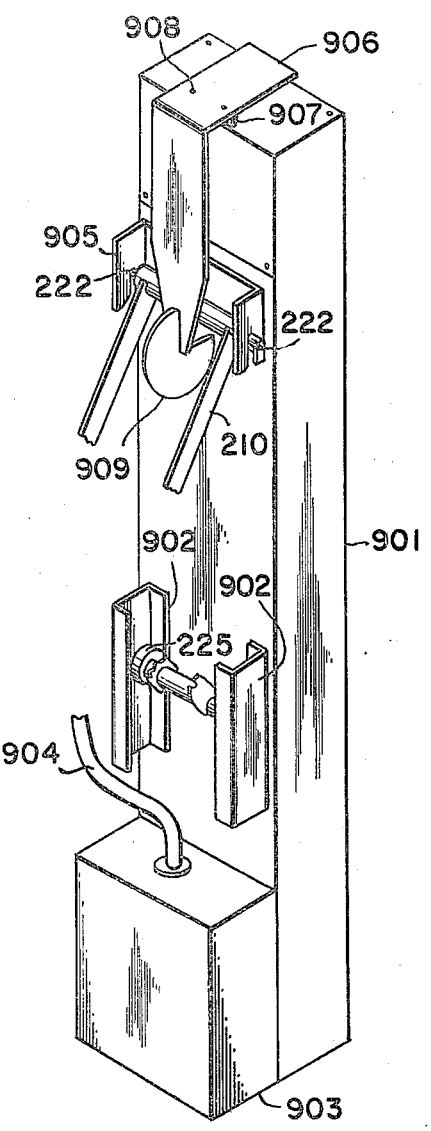
FIG. 9 is an oblique perspective view of the rear of a heater.

In FIG. 9, 901 is a typical heating element. The rear side of the hearing element is provided with opposed U-shaped guides 902 for rollers 225 of the scissors linkage on which the element is supported. An electrical junction box 903 is provided at the rear of the heating element, and receives current through flexible cable 904. A bracket 905, with downwardly open notches receives pins 222 of scissors linkage 210. 906 is an L-shaped release arm supported at the upper end of heating element 901 on spacers 907 and pins 908. The lower end of the depending portion of release arm 906 is provided with a latch element 909 which rests snugly against the back of the heater by gravity, and engages the underside of the horizontal element from which pins 222 extend to prevent removal of pins 222 from the notches of bracket 905. Latch element 909 is shaped so that it is cammed out of the way of the heating element is installed on the scissors linkage. When the heating element is fully installed, the latching element automatically assumes its latching position. It is unlatched by depressing the horizontal portion of release arm 906, which causes the release arm to swing about its mounting pins so that latching element 909 clear the horizontal element at the upper end of the scissors linkage to allow for removal of the heating element.

Figure 10:
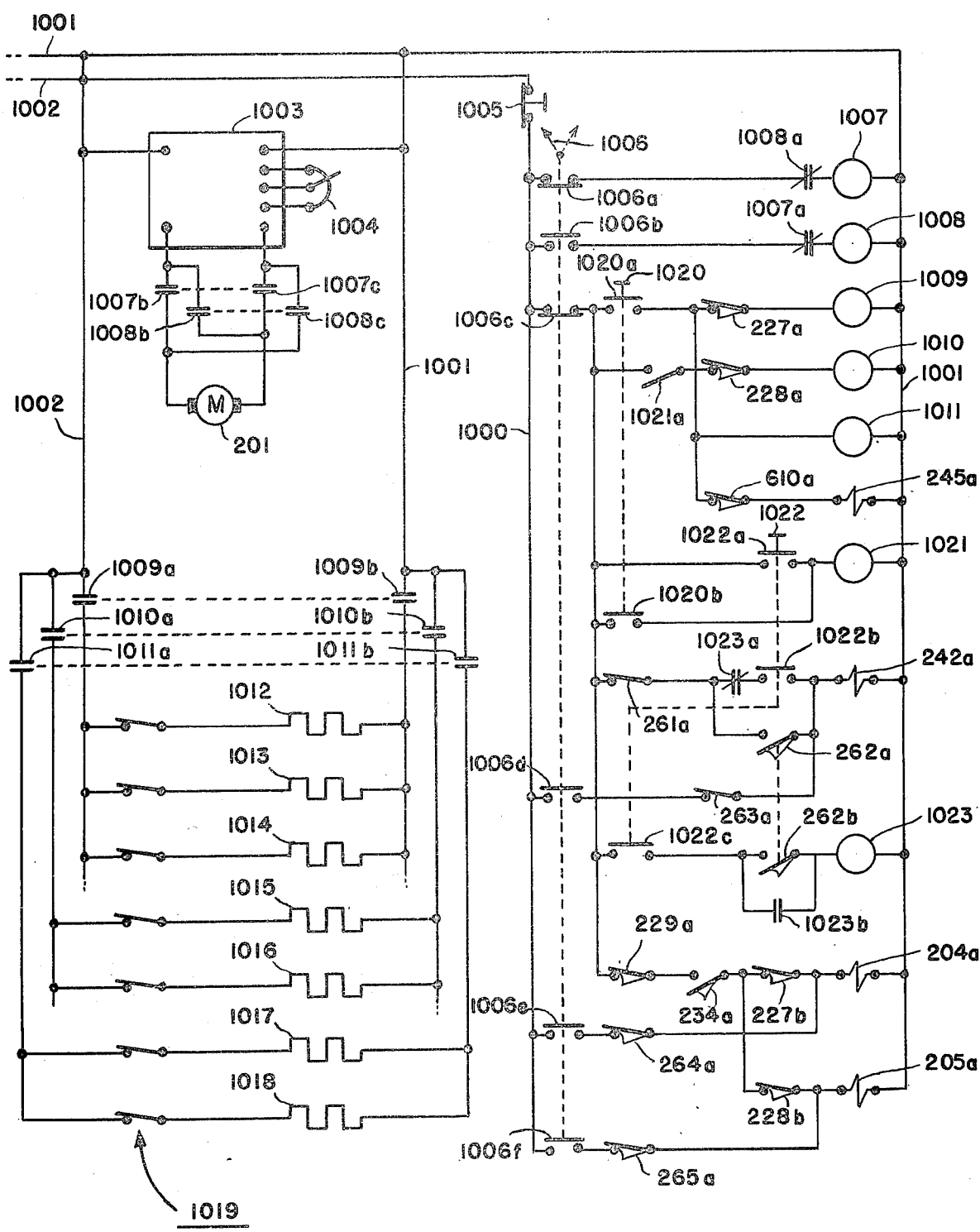
FIG. 10 is an electrical schematic of the control system for the broiling apparatus in accordance with the invention.

The operation of the apparatus just described is best understood by reference to FIGS. 2 and 10, wherein related components have corresponding numbers. For example, the contacts of microswitch 227 of FIG. 2 are labeled 227a and 227b in FIG. 10. Similarly, the solenoid of solenoid-operated clutch 245 of FIG. 2 is labeled 245a in FIG. 10. In FIG. 10, all switches are shown in the conditions which they are in when the spit is rotating, but the heating elements and cutter are not operating.

AC electrical power is delivered to the electrical circuitry through lines 1001 and 1002. A conventional direct current motor drive circuit 1003 receives alternating current from these lines, and delivers direct current to motor 201 through a set of reversing relay contacts 1007b, 1007c, 1008b and 1008c. A speed adjustment, to adjust the voltage delivered to the motor is provided at 1004. Line 1002 is connected through stop push-button 1005 to line 1000. Push-button 1005 is of the maintained type. Once it is pushed in it remains in until it is manually pulled out. The control circuitry on the right side of FIG. 10 is energized through a six-pole forward-reverse switch 1006. This switch is shown in the position to produce forward movement of the motor, i.e. movement in a direction to advance the heating elements and the cutting assembly toward the drum axis.

Contacts 1006a, which are closed when the switch is in the "forward" position, connect line 1000 to relay coil 1007, through normally closed contacts 1008a of a second relay coil 1008. Contacts 1006b, which are open when the switch is in the "forward" position, similarly connect line 1000 to relay coil 1008 through normally closed contacts 1007a. When lines 1001 and 1002 are energized, coil 1007 becomes energized, opening contacts 1007a, and closing contacts 1007b and 1007c. Main drive motor 201 begins to operate in the forward direction. The opening of contacts 1007a disables relay coil 1008.

When motor 201 starts, none of the four clutches 204, 205, 242 and 245 is engaged. Consequently, the only initial motion in the apparatus is the rotation of spit drive shaft 203, which is in direct driving relationship with motor 201 through gear box 202.

Relay coils 1009, 1010 and 1011 are provided to energize electrical heating elements 1012-1018. Electrical heating elements 1012, 1013 and 1014, which are controlled through contacts 1009a and 1009b, are stationary heating elements on positioning shafts 206. Heating elements 1015 and 1016 which are controlled through contacts 1010a and 1010b, are movable heating elements supported on and controlled by positioning shafts 207. Heating elements 1017 and 1018, which are energized through contacts 1011a and 1011b, are supported on and controlled by positioning shafts 208. Each electrical heating element is provided with its own manually operable control switch in group 1019.

A two-pole momentary push-button having contacts 1020a and 1020b is used to initiate electrical energization of the heating elements by simultaneously energizing relay coils 1009, 1010 and 1011. Relay coil 1021, which is energized through contacts 1020b, causes contacts 1021a to close, to maintain energization of the heating element control relays. Relay 1021 is a delay-type relay, which produces a delayed opening of contacts 1021a, after a predetermined interval following the opening of contacts 1020b unless the cutter-activating push-button 1022 is actuated to close contacts 1022a during that interval. The main purpose of delay relay 1021 is to prevent overcooking by turning off the heaters automatically if a predetermined lapse of time occurs without any call for slicing.

Operation of the starting push-button having contacts 1020a and 1020b also energizes coil 245a of clutch 241 to initiate reciprocation of the cutter blades. Since clutch solenoid 245a is in series with contacts 610a of switch 610, the cutter cannot operate unless the locking mechanism holding the upper end of the cutter assembly in place is in the locked condition illustrated in FIG. 6B.

Push-button 1022, having contacts 1022a, 1022b and 1022c, is used to initiate operation of the paring means and of the heating element advancing mechanism. Closure of contacts 1022a energizes relay coil 1021, which maintains the heating elements in an energized condition while cutting is taking place. Contacts 1022b effect energization of clutch solenoid 242a. This engages clutch 242, and initiates movement of the cutting mechanism driving carriage 238. As the carriage moves to the right, switch 234 is cleared by cam 236. Contacts 234a close and provide a path for electrical energization of clutch solenoid 204a. Activation of clutch 204 initiates rotation of heating element positioning shafts 207, and the heating elements carried on shafts 207 are advanced toward the drum axis. Clutch solenoid 205a is also energized through contacts 234a, and the consequent activation of clutch 205 causes the heating elements on shafts 208 to advance. The advancing movement of the leftmost heating element causes flexible cord 231 to pull bracket 232 in the direction of movement of carriage 238 so that, if the heating elements advance ahead of carriage 238, switch 234 is activated by cam 236, and contacts 234a open, disengaging clutches 204 and 205. From this mode of operation, it will be apparent that the movable heating elements automatically follow the movement of the carriage, and stop moving whenever the carriage stops moving.

From FIG. 2, it will be apparent that microswitch assembly 257 moves to the left along control cam bank 258 as carriage 238 moves to the left. To prevent overtravel, if the microswitch assembly reaches the left-hand end of the bank of cams, contacts 261a are opened, cutting off current to clutch solenoid 242a, to stop the movement of the carriage and of the microswitch assembly.

To initiate cutting, push-button 1022 is depressed. Closure of contacts 1022b energizes clutch solenoid 242a to initiate movement of carriage 238.

Initially, the operator of microswitch 262 rests in a notch in cam 259 (FIG. 2) and its contacts 262a and 262b are open. However, as soon as microswitch assembly 257 begins to move, the operator of switch 262 rises out of the notch in cam 259, and the microswitch contacts are closed. Solenoid 242a, therefore, remains energized through contacts 262a.

Cam 259 has a series of notches, which as seen in FIG. 2, are spaced close together at the middle of the cam, and are progressively farther apart toward the ends of the cam. This cam controls the duration of the cutting operation initiated by depression of push-button 1022. Because of the wider spacing between the notches at the right-hand end of the cam, the cutting operations are of longer duration as cutting of the drum begins, and progressively shorter in duration, as cutting proceeds, until the microswitch assembly reaches the middle of cam 259. As the microswitch assembly continues to move toward the left-hand end of the cam, the cutting operations become progressively longer in duration.

The object of the notch configuration in cam 259 is to insure the cutting of a uniform amount of meat in each cutting operation. The notch configuration needed to produce uniform portions, of course, depends on the drum shape. Cam 259 can be made replaceable so that different drum shapes can be accommodated.

In operation, the microswitch assembly moves from one notch to the next, each time push-button 1022 is depressed.

As soon as microswitch assembly 257 reaches the next notch in the series, contacts 262a and 262b reopen, causing deenergization of solenoid 242a, and causing the carriage and the microswitch assembly to stop until push-button 1022 is again depressed.

In order to prevent cutting from continuing if push-button 1022 is accidentally held closed, a relay 1023 is provided. This relay has a normally open set of contacts 1023b in parallel with microswitch contacts 262b, and a normally closed set of contacts 1023a in series with push-button contacts 1022b. A set of push-button contacts 1022c are connected in series with relay coil 1023. If push-button 1022 is held, contacts 1022c are closed, and relay coil 1023 is held energized through its own contacts 1023b even after microswitch contacts 262b open. Because relay 1023 remains energized, its contacts 1023a are held open. This prevents solenoid 242a from being continuously energized through push-button contacts 1022b. Consequently, solenoid 242a is deenergized when microswitch contacts 262a open when the microswitch assembly reaches the next notch in the series on cam 259. Because of this circuit, push-button 1022 must be released and depressed again in order to initiate another cutting operation.

As the leftmost heating element moves toward the spit axis, microswitches 227, 228 and 229 are actuated successively by cam 230. When contacts 227a open, relay 1009 opens contacts 1009a and 1009b, to cut off the delivery of current to stationary heating elements 1012, 1013 and 1014, to prevent these heaters from operating when the movable heaters advance beyond positions determined by the location of microswitch 227.

Microswitch 228, similarly opens contacts 228a, cutting off current to relay 1010, whose contacts 1010a and 1010b open, disabling heating elements 1015 and 1016 on positioning shafts 207. Contacts 227b simultaneously open, cutting off current to clutch solenoid 204a. Clutch 204 disengages, and positioning shafts 207 stop rotating so that the heating elements carried on these shafts. The reason for stopping the heating elements on shafts 207 is primarily to allow room for further movement of the heating elements on positioning shafts 208. Microswitch 229, when actuated by cam 230, opens contacts 229a, which control current to clutches 204a and 205a. Opening of contacts 229a, disables these two clutches (assuming that switch 1016 is in the forward position), and stops the forward movement of the heating elements on shafts 207.

Resetting of the apparatus is accomplished by switching switch 1006 to its reversing position. Contacts 1006a open, and contacts 1006b close, thereby initiating movement of motor 201 in the reverse direction. Contacts 1006c open, disabling the heating elements and the cutter operating clutch 245. Contacts 1006d close, causing current to be delivered to carriage clutch 242a until cam-operated limit switch 263a opens when the microswitch assembly moves to the right-hand end of the cam bank. Contacts 1006e and 1006f energize clutches 204a and 205a, to cause the movable heating elements to return to their initial positions. Switch 264 is actuated when the heating element on the third positioning shaft is returned to its initial position. Switch 265 is actuated when the heating element on the leftmost positioning shaft is returned to its initial position. Contacts 264a are arranged to disable clutch solenoid 204a, and contacts 265a are arranged to disable clutch solenoid 205a so long as switch 1006 is in the "reverse" position so that contacts 1006c are open. When contacts 1006c are closed, of course, there is another path for energization of clutch solenoids 204a and 205a, so that the heating elements can begin to move forward from their initial positions.

The operation of the apparatus may be summarized as follows. After the drum of meat is assembled on the spit, and the spit is installed on spit drive shaft 203 and upper bearing 103, operation of the apparatus is initiated by pulling button 1005. (This button is of the "maintained" type, i.e. it remains in either position.) Closing of the contacts of push-button 1005 causes the spit to begin rotating. Switch 1006 is in the "forward" position. Operation of the heating elements is initiated by depressing push-button 1020 momentarily. Relay 1021 is energized through contacts 1020b and heater relay coils 1009, 1010 and 1011 are energized through relay contacts 1021a. Relay 1021 is a delayed opening relay. The drum of meat begins to cook by radiant heat from the heating elements, all of which are operative at this time. Assuming that there is no call for cooked meat, the heating elements will be deenergized after a predetermined interval determined by delay relay 1021. Cooking can be reestablished by again depressing push-button 1020.

When it is desired to pare some meat from the drum, push-button 1022 is depressed momentarily. Contacts 1022a close and establish a path for energization of relay 1021, which enables all of the heating elements through its contacts 1021a regardless of the condition of push-button 1020. Thus, each time a cutting operation is initiated, a cooking interval is also initiated automatically. Whether the heating elements are all energized, however, depends upon their positions, and upon the conditions of contacts 227a and 228a. The cutter assembly advances automatically, and begins slicing cooked meat from the outside of the drum. The cutter continues to slice until microswitch 262 reaches a next notch in cam 259, at which point cutting stops automatically. After a predetermined interval following the release of push-button 1022, the heating elements are deenergized by the opening of delay relay contacts 1021a.

Cooking and slicing of the drum can take place until the drum reaches a predetermined minimum diameter, where switch 261 is operated by the cam bank. When contacts 261a open, the carriage 238 and the movable heating elements can no longer advance. The apparatus is reset by moving switch 1006 to the "reverse" position. This disables the heating elements, and causes the heating elements and cutting apparatus to move to their initial positions.

From the foregoing, it will be apparent that the invention provides a broiling apparatus capable of rapid and efficient operation and suitable for use in a restaurant or similar establishment; that it is capable of producing a uniformly cooked product; and that, by virtue of the drum assembly of FIG. 4A, the invention is capable of handling a wide variety of meats. Among the important advantages of the invention are the fact that it is capable of automatically slicing a predetermined amount of meat upon momentary depression of a single push-button control (push-button 1022); and that the amount of meat sliced from the drum in each single cutting operation can be made substantially uniform by virtue of the shape of the drum and by virtue of the configuration of notched control cam 259. The broiling apparatus is accordance with the invention also possesses the advantage that it delivers meat which is both freshly cooked and freshly sliced.

Numerous modifications can be made to the specific apparatus described above. For example, while electric heaters are described, the heating elements can be designed for operation by gas or charcoal or by other fuels. If desired, the heating elements can incorporate combinations of heat sources. The control system of FIG. 10 can be modified, for example, by using electronic equivalents of the switches and relays or even by using microprocessor control. If desired, cam 259 of cam bank 258 (FIG. 2) can be made removable for replacement by other control cams having different arrangements of notches. The substitution of cam 259 would be desirable, for example, in the event that the shape of the drum of meat is substantially changed.

We claim:

1. Broiling apparatus for meat comprising:
   rotatable spit means for holding a drum of meat and rotating the meat about an axis;
   means for rotating the spit means;
   heating means for applying radiant heat to the meat held on the spit means; and
   paring means for removing an outer layer from said drum of meat, comprising blade means having a cutting edge extending substantially parallel to the spit axis of rotation, and means for advancing said blade means toward the spit axis as the spit means rotates.

2. Broiling apparatus according to claim 1 in which said means for advancing said blade means constrains said blade means for movement in a substantially straight path toward the spit axis.

3. Broiling apparatus according to claim 1 having means for advancing at least part of said heating means toward the meat as the spit means rotates.

4. Broiling apparatus according to claim 1 in which said heating means comprises at least two heating elements, in which one of said heating elements is movable toward the spit axis, having means for advancing said movable heating element toward the meat as the spit means rotates, and means for automatically disabling the other heating element when the movable heating element reaches an intermediate location in its path of travel.

5. Broiling means according to claim 1 in which said heating means comprises at least two heating elements both of which are movable toward the spit axis in coverging paths, having means for advancing said heating elements as the spit means rotates, and means for automatically stopping the movement of one of said heating elements at an intermediate location in its path of travel while permitting the other heating element to continue its advancing movement, whereby said heating elements are prevented from interfering with each other.

6. Broiling apparatus according to claim 1 in which said spit means comprises an elongated rod located at the spit axis and aligned therewith, said rod having a substantially uniform non-circular cross-section along at least a portion of its length, a series of circular plates having non-circular openings receiving said rod and being axially slidable on the non-circular portion of the rod, and prevented from lateral translation and from rotation relative to the rod by engagement of said non-circular openings with said non-circular portion of the rod, said plates having axially extending teeth at their peripheries, and clamp means located at opposite ends of the series of plates for clamping the opposite ends of a series of layers of meat, said plates being positionable between adjacent layers of meat and preventing rotation of said layers relative to said rod by the engagement of their teeth with said layers.

7. Broiling apparatus according to claim 1 having control means, responsive to manual initiation, for causing said advancing means to move said blade means through a predetermined distance toward said spit axis followed each manual initiation.

8. Broiling apparatus according to claim 7 in which said control means comprises means for causing the predetermined distance through which the blade means moves to vary as the blade means approaches the spit axis.

9. Broiling apparatus according to claim 7 in which said control means comprises means, also responsive to said manual initiation, for effecting operation of said heating means for a predetermined interval following said manual initiation.

* * * * *